US012769781B2

(12) United States Patent
Singh et al.

(10) Patent No.: US 12,769,781 B2
(45) Date of Patent: Oct. 20, 2026

(54) SYSTEMS AND METHODS FOR MATCHING DATA ENTITIES

(71) Applicant: Walmart Apollo, LLC, Bentonville, AR (US)

(72) Inventors: Deep Narain Singh, Sunnyvale, CA (US); Suresh Visvanathan, San Jose, CA (US); Prajwal Chandrashekaraiah, Bangalore (IN); Kenny Lov, San Jose, CA (US)

(73) Assignee: Walmart Apollo, LLC, Bentonville, AR (US)

( * ) Notice: Subject to any disclaimer, the term of this patent is extended or adjusted under 35 U.S.C. 154(b) by 50 days.

(21) Appl. No.: 18/891,277

(22) Filed: Sep. 20, 2024

(65) Prior Publication Data

US 2025/0225169 A1 Jul. 10, 2025

Related U.S. Application Data

(60) Provisional application No. 63/619,381, filed on Jan. 10, 2024.

(51) Int. Cl.

*G06F 16/383* (2019.01)
*G06F 16/35* (2025.01)
*G06F 40/284* (2020.01)

(52) U.S. Cl.

CPC ............ *G06F 16/383* (2019.01); *G06F 16/35* (2019.01); *G06F 40/284* (2020.01)

(58) Field of Classification Search

CPC ....... G06F 16/383; G06F 16/35; G06F 40/284
See application file for complete search history.

(56) References Cited

U.S. PATENT DOCUMENTS 11,330,009 B2 * 5/2022 Liu ....................... G06F 16/285
2019/0138653 A1 * 5/2019 Roller .................... G06Q 10/10

(Continued)

FOREIGN PATENT DOCUMENTS

CN 109272011 A 1/2019
CN 113779996 A 12/2021

OTHER PUBLICATIONS

Michael et al. Oct. 26, 2017, "Modeling Relational Data with Graph Convolutional Networks", https://arxiv.org/pdf/1703.06103 (Year: 2017).*

(Continued)

*Primary Examiner* — Matthew J Ellis
(74) *Attorney, Agent, or Firm* — Morgan, Lewis & Bockius LLP; Manita Rawat

(57) ABSTRACT

Example implementations relate to automatically identifying matching data entities. A determination request is received and for each of a first data entity and a second data entity, a sequence of demarcated attributes is generated. A similarity score is generated, using a trained classification model, between the first data entity and the second data entity that accounts for feature interactions between the first data entity and the second data entity. The trained classification model receives the demarcated attributes for each of the first data entity and the second data entity as inputs, and is trained using a dataset of annotated pairs of data entities. Weights in the trained classification model are determined based on a customizable loss function. In accordance with a determination that the similarity score is greater than a predetermined threshold, an indication that the first data entity matches the second data entity is generated.

17 Claims, 10 Drawing Sheets

(56) References Cited

U.S. PATENT DOCUMENTS

| | | | | |
|---|---|---|---|---|
| 2019/0325068 | A1* | 10/2019 | Lai | G06Q 30/0631 |
| 2020/0210431 | A1* | 7/2020 | Bordawekar | G06F 16/212 |
| 2020/0272845 | A1 | 8/2020 | He et al. | |
| 2023/0061341 | A1* | 3/2023 | Shmueli | G06F 16/258 |
| 2023/0186025 | A1* | 6/2023 | John | G06F 16/243 704/9 |
| 2024/0177818 | A1* | 5/2024 | Goravar | G16H 50/20 |
| 2024/0193470 | A1* | 6/2024 | Tiwari | G06N 20/00 |

OTHER PUBLICATIONS

A. Vilcek et al., "Transformer-Based Deep Siamese Network for At-Scale Product Matching and One-Shot Hierarchy Classification," Association for Computing Machinery, (Year: 2018), 11 pages.

* cited by examiner

SYSTEMS AND METHODS FOR MATCHING DATA ENTITIES

CROSS-REFERENCE TO RELATED APPLICATIONS

This application claims priority to U.S. Provisional Patent Application No. 63/619,381, filed Jan. 10, 2024, entitled "Systems and Methods for Matching Data Entries," which is incorporated by reference herein in its entirety.

TECHNICAL FIELD

This application relates generally to automated matching of data entities, and more particularly, to automated matching of an identified data entity with one or more data entities in a different database.

BACKGROUND

Entity matching may be used to match data entities (e.g., data elements representative of items stored in a catalog associated with a network environment). Entity matching involves determining if an identified data entity and one or more other candidate data entities correspond to the same (e.g., real-world) entity. Challenges to accurately determining whether two data entities correspond to the same represented entity may include: different data sources representing the same entity in different ways such that there is not a single standardized way of representing the entity; different attributes representing an entity and/or included in a data entity may have different standardization metrics; noisy data that may include missing or incorrect identifiers; sparsity in data especially when important attributes of an entity might be missing in the data; presence of similar entities that differ because of small variation in an attribute; scale in the number of entities that may be a match (e.g., a billion entities, etc.); and evolving trends in data due to changes in user behavior, data drift, data source, and network behavior that may lead to new patterns in data.

BRIEF DESCRIPTION OF THE DRAWINGS

Various examples will be described by the following detailed description, which is to be considered together with the accompanying drawings wherein like numbers refer to like parts and further wherein.

DETAILED DESCRIPTION

Figure 1:
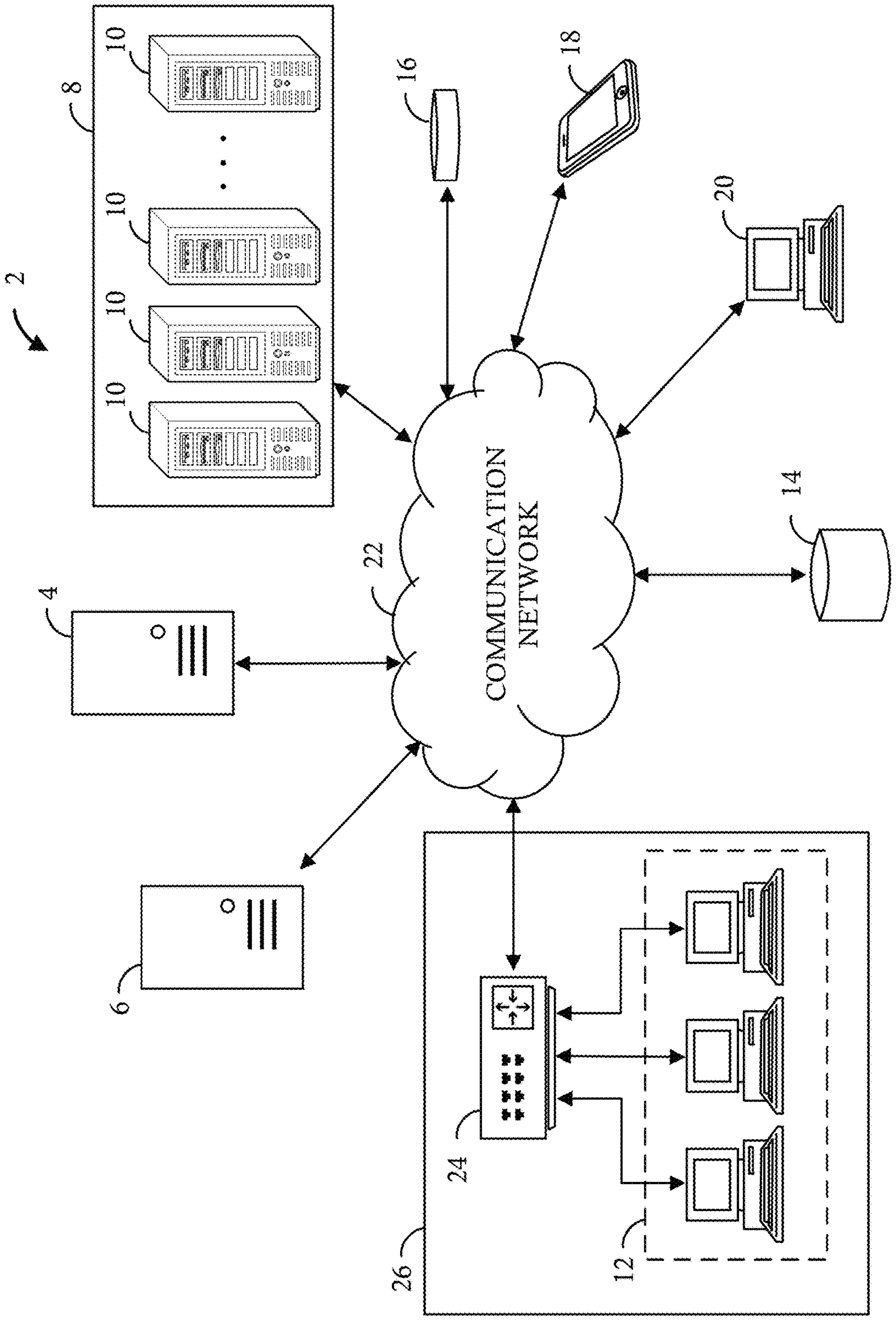
FIG. 1 illustrates a network environment that provides an automated entity matching functionality, in accordance with some embodiments.

This description of the example embodiments is intended to be read in connection with the accompanying drawings, which are to be considered part of the entire written description. Terms concerning data connections, coupling and the like, such as "connected" and "interconnected," and/or "in signal communication with" refer to a relationship wherein systems or elements are electrically connected (e.g., wired, wireless, etc.) to one another either directly or indirectly through intervening systems, unless expressly described otherwise. The term "operatively coupled" is such a coupling or connection that allows the pertinent structures to operate as intended by virtue of that relationship.

In the following, various embodiments are described with respect to the claimed systems as well as with respect to the claimed methods. Features, advantages, or alternative embodiments herein may be assigned to the other claimed objects and vice versa. In other words, claims for the systems may be improved with features described or claimed in the context of the methods. In this case, the functional features of the method are embodied by objective units of the systems. While the present disclosure is susceptible to various modifications and alternative forms, specific embodiments are shown by way of example in the drawings and will be described in detail herein. The objectives and advantages of the claimed subject matter will become more apparent from the following detailed description of these example embodiments in connection with the accompanying drawings.

In various embodiments, a system including a non-transitory memory and a processor communicatively coupled to the non-transitory memory is disclosed. The processor reads a set of instructions to receive, from a requesting system, a determination. For each of a first data entity and a second data entity, the processor reads the set of instructions to generate a sequence of demarcated attributes. The processor further reads the set of instructions to generate, using a trained classification model, a similarity score between the first data entity and the second data entity that accounts for feature interactions between the first data entity and the second data entity and, in accordance with a determination that the similarity score is greater than a predetermined threshold, generate an indication that the first data entity matches the second data entity. The trained classification model receives the demarcated attributes for each of the first data entity and the second data entity as inputs and is trained using a dataset of annotated pairs of data entities. The weights in the trained classification model are determined based on a customizable loss function.

In various embodiments, a computer-implemented method is disclosed. The computer-implemented method includes steps of receiving, from a requesting system, a determination request, and for each of a first data entity and a second data entity, generating a sequence of demarcated attributes The method includes steps of generating, using a trained classification model, a similarity score between the first data entity and the second data entity that accounts for feature interactions between the first data entity and the second data entity; and in accordance with a determination that the similarity score is greater than a predetermined threshold, the method includes a step of generating an indication that the first data entity matches the second data entity. The trained classification model receives the demarcated attributes for each of the first data entity and the second data entity as inputs and is trained using a dataset of annotated pairs of data entities, and weights in the trained classification model are determined based on a customizable loss function.

In various embodiments, a non-transitory computer readable medium having instructions stored thereon is disclosed. The instructions, when executed by at least one processor, cause at least one device to perform operations including receiving, from a requesting system, a determination request; and for each of a first data entity and a second data entity, generating a sequence of demarcated attributes The instructions cause the at least one device to perform operations including generating, using a trained classification model, a similarity score between the first data entity and the second data entity that accounts for feature interactions between the first data entity and the second data entity; and in accordance with a determination that the similarity score is greater than a predetermined threshold, and the instructions cause the at least one device to perform operations including generating an indication that the first data entity matches the second data entity. The trained classification model receives the demarcated attributes for each of the first data entity and the second data entity as inputs and is trained using a dataset of annotated pairs of data entities, and weights in the trained classification model are determined based on a customizable loss function.

Furthermore, in the following, various embodiments are described with respect to methods and systems for automated entity matching. In various embodiments, a similarity score is generated, using a trained model, based on information between a first data entity and a second data entity that accounts for feature interactions between the first data entity and the second data entity.

In the context of an e-commerce environment, entity matching may help to ensure competitive pricing for an identified entity with a match product from one or more different ecommerce environments, may provide for detection of anomalous pricing in the ecommerce environment, may allow identification of duplicate entities in one or more catalogs, may provide for merging of the same or variant entities under a particular data entity, and/or may allow a determination regarding gaps with respect to certain associated elements or features, such as brand features or associated sellers. Entity matching may be particularly challenging when a large number of items (e.g., billions of items) spanning a large number of categories (e.g., thousands of categories, millions of categories, etc.) are to be automatically matched with high precision and recall. Rule-based methods to automatically match items may be more difficult to scale and generalize, compared to the methods and systems described herein.

In general, a trained function mimics cognitive functions that humans associate with other human minds. In particular, by training based on training data the trained function is able to adapt to new circumstances and to detect and extrapolate patterns.

In general, parameters of a trained function may be adapted by means of training. In particular, a combination of supervised training, semi-supervised training, unsupervised training, reinforcement learning and/or active learning may be used. Furthermore, representation learning (an alternative term is "feature learning") may be used. In particular, the parameters of the trained functions may be adapted iteratively by several steps of training.

In some embodiments, a trained function may include a neural network, a support vector machine, a decision tree, a Bayesian network, a clustering network, Qlearning, genetic algorithms and/or association rules, and/or any other suitable artificial intelligence architecture. In some embodiments, a neural network may be a deep neural network, a convolutional neural network, a convolutional deep neural network, etc. Furthermore, a neural network may be an adversarial network, a deep adversarial network, a generative adversarial network, etc.

FIG. 1 illustrates a network environment 2 that provides an automated entity matching functionality, in accordance with some embodiments. The network environment 2 includes a plurality of devices or systems that communicate over one or more network channels, illustrated as a network cloud 22. For example, in various embodiments, the network environment 2 may include, but is not limited to, an entity matching computing device 4, a web server 6, a cloud-based engine 8 including one or more processing devices 10, workstation(s) 12, a database 14, and/or one or more user computing devices 16, 18, 20 operatively coupled over the network 22. The entity matching computing device 4, the web server 6, the processing device(s) 10, the workstation(s) 12, and/or the user computing devices 16, 18, 20 may each be a suitable computing device that includes any hardware or hardware and software combination for processing and handling information. For example, each computing device may include, but is not limited to, one or more processors, one or more field-programmable gate arrays (FPGAs), one or more application-specific integrated circuits (ASICs), one or more state machines, digital circuitry, and/or any other suitable circuitry. In addition, each computing device may transmit and receive data over the communication network 22.

In some embodiments, each of the entity matching computing device 4 and the processing device(s) 10 may be a computer, a workstation, a laptop, a server such as a cloud-based server, or any other suitable device. In some embodiments, each of the processing devices 10 is a server that includes one or more processing units, such as one or more graphical processing units (GPUs), one or more central processing units (CPUs), and/or one or more processing cores. Each processing device 10 may, in some embodiments, execute one or more virtual machines. In some embodiments, processing resources (e.g., capabilities) of the one or more processing devices 10 are offered as a cloud-based service (e.g., cloud computing). For example, the cloud-based engine 8 may offer computing and storage resources of the one or more processing devices 10 to the entity matching computing device 4.

In some embodiments, each of the user computing devices 16, 18, 20 may be a cellular phone, a smart phone, a tablet, a personal assistant device, a voice assistant device, a digital assistant, a laptop, a computer, or any other suitable device. In some embodiments, the web server 6 hosts one or more network environments, such as an e-commerce network environment. In some embodiments, the entity matching computing device 4, the processing devices 10, and/or the web server 6 are operated by the network environment provider, and the user computing devices 16, 18, 20 are operated by users of the network environment. In some embodiments, the processing devices 10 are operated by a third party (e.g., a cloud-computing provider).

The workstation(s) 12 are operably coupled to the communication network 22 via a router (or switch) 24. The workstation(s) 12 and/or the router 24 may be located at a physical location 26 remote from the entity matching computing device 4, for example. The workstation(s) 12 may communicate with the entity matching computing device 4 over the communication network 22. The workstation(s) 12 may send data to, and receive data from, the entity matching computing device 4. For example, the workstation(s) 12 may transmit data related to one or more data entities selected for entity matching to the entity matching computing device 4.

Although FIG. 1 illustrates three user computing devices 16, 18, 20, the network environment 2 may include any number of user computing devices 16, 18, 20. Similarly, the network environment 2 may include any number of the entity matching computing device 4, the web server 6, the processing devices 10, the workstation(s) 12, and/or the databases 14. It will further be appreciated that additional systems, servers, storage mechanism, etc. may be included within the network environment 2. In addition, although embodiments are illustrated herein having individual, discrete systems, it will be appreciated that, in some embodiments, one or more systems may be combined into a single logical and/or physical system. For example, in various embodiments, one or more of the entity matching computing device 4, the web server 6, the workstation(s) 12, the database 14, the user computing devices 16, 18, 20, and/or the router 24 may be combined into a single logical and/or physical system. Similarly, although embodiments are illustrated having a single instance of each device or system, it will be appreciated that additional instances of a device may be implemented within the network environment 2. In some embodiments, two or more systems may be operated on shared hardware in which each system operates as a separate, discrete system utilizing the shared hardware, for example, according to one or more virtualization schemes.

The communication network 22 may be a WiFi® network, a cellular network such as a 3GPP® network, a Bluetooth® network, a satellite network, a wireless local area network (LAN), a network utilizing radio-frequency (RF) communication protocols, a Near Field Communication (NFC) network, a wireless Metropolitan Area Network (MAN) connecting multiple wireless LANs, a wide area network (WAN), or any other suitable network. The communication network 22 may provide access to, for example, the Internet.

Each of the user computing devices 16, 18, 20 may communicate with the web server 6 over the communication network 22. For example, each of the user computing devices 16, 18, 20 may be operable to view, access, and interact with a website, such as an e-commerce website, hosted by the web server 6. The web server 6 may transmit user session data related to a user's activity (e.g., interactions) on the website. For example, a user may operate one of the user computing devices 16, 18, 20 to initiate a web browser that is directed to the website hosted by the web server 6. The user may, via the web browser, perform various operations such as searching one or more databases or catalogs associated with the displayed website, view item data for elements associated with and displayed on the website, and click on interface elements presented via the website, for example, in the search results. The website may capture these activities as user session data, and transmit the user session data to the entity matching computing device 4 over the communication network 22.

In some embodiments, the entity matching computing device 4 may execute one or more models, processes, or algorithms, such as a machine learning model, deep learning model, statistical model, etc., to determine if a first data entity matches a second data entity. In some embodiments, the web server 6 transmits an entity matching request to the entity matching computing device 4. The entity matching computing device 4 is further operable to communicate with the database 14 over the communication network 22. For example, the entity matching computing device 4 may store data to, and read data from, the database 14. The database 14 may be a remote storage device, such as a cloud-based server, a disk (e.g., a hard disk), a memory device on another application server, a networked computer, or any other suitable remote storage. Although shown remote to the entity matching computing device 4, in some embodiments, the database 14 may be a local storage device, such as a hard drive, a non-volatile memory, or a USB stick. The entity matching computing device 4 may store interaction data received from the web server 6 in the database 14. The entity matching computing device 4 may also receive from the web server 6 user session data identifying events associated with browsing sessions, and may store the user session data in the database 14.

In some embodiments, the entity matching computing device 4 generates training data for a plurality of models (e.g., machine learning models, deep learning models, statistical models, algorithms, etc.). The entity matching computing device 4 and/or one or more of the processing devices 10 may train one or more models based on corresponding training data. The entity matching computing device 4 may store the models in a database, such as in the database 14 (e.g., a cloud storage database).

The models, when executed by the entity matching computing device 4, allow the entity matching computing device 4 to determine if a first data entity matches a second data entity. For example, the entity matching computing device 4 may obtain one or more models from the database 14. The entity matching computing device 4 may then receive, in real-time from the web server 6, a determination if the first data entity matches the second data entity.

In some embodiments, the entity matching computing device 4 assigns the models (or parts thereof) for execution to one or more processing devices 10. For example, each model may be assigned to a virtual machine hosted by a processing device 10. The virtual machine may cause the models or parts thereof to execute on one or more processing units such as GPUs. In some embodiments, the virtual machines assign each model (or part thereof) among a plurality of processing units. Based on the output of the models, entity matching computing device 4 may generate a similarity score for a pair of data entities.

Figure 2:
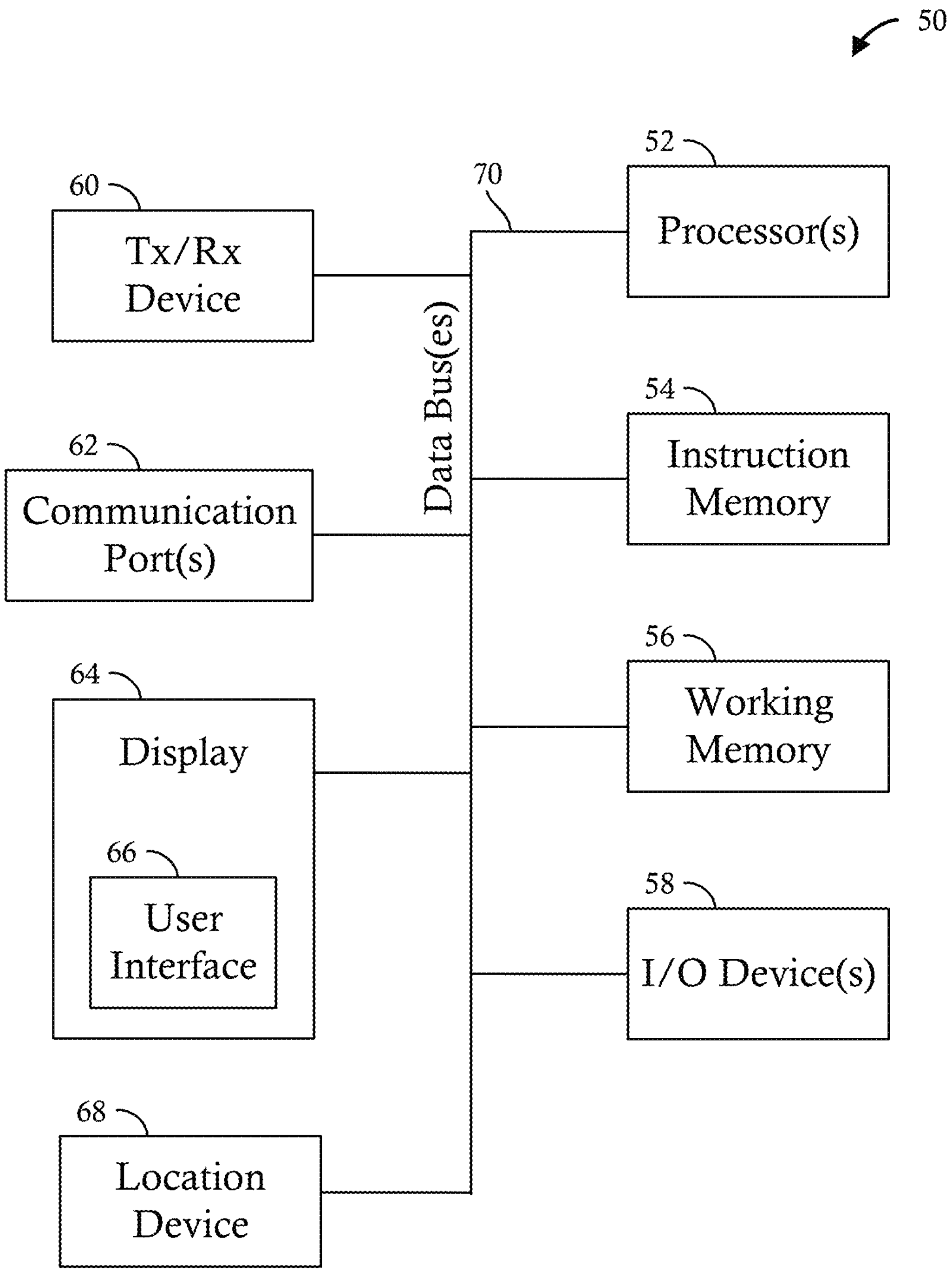
FIG. 2 illustrates a computer system that implements one or more processes, in accordance with some embodiments.

FIG. 2 illustrates a block diagram of a computing device 50, in accordance with some embodiments. In some embodiments, each of the entity matching computing device 4, the web server 6, the one or more processing devices 10, the workstation(s) 12, and/or the user computing devices 16, 18, 20 in FIG. 1 may include the features shown in FIG. 2. Although FIG. 2 is described with respect to certain components shown therein, it will be appreciated that the elements of the computing device 50 may be combined, omitted, and/or replicated. In addition, it will be appreciated that additional elements other than those illustrated in FIG. 2 may be added to the computing device.

As shown in FIG. 2, the computing device 50 may include one or more processors 52, an instruction memory 54, a working memory 56, one or more input/output devices 58, a transceiver 60, one or more communication ports 62, a display 64 with a user interface 66, and an optional location device 68, all operatively coupled to one or more data buses 70. The data buses 70 allow for communication among the various components. The data buses 70 may include wired, or wireless, communication channels.

The one or more processors 52 may include any processing circuitry operable to control operations of the computing device 50. In some embodiments, the one or more processors 52 include one or more distinct processors, each having one or more cores (e.g., processing circuits). Each of the distinct processors may have the same or different structure. The one or more processors 52 may include one or more central processing units (CPUs), one or more graphics processing units (GPUs), application specific integrated circuits (ASICs), digital signal processors (DSPs), a chip multiprocessor (CMP), a network processor, an input/output (I/O) processor, a media access control (MAC) processor, a radio baseband processor, a co-processor, a microprocessor such as a complex instruction set computer (CISC) microprocessor, a reduced instruction set computing (RISC) microprocessor, and/or a very long instruction word (VLIW) microprocessor, or other processing device. The one or more processors 52 may also be implemented by a controller, a microcontroller, an application specific integrated circuit (ASIC), a field programmable gate array (FPGA), a programmable logic device (PLD), etc.

In some embodiments, the one or more processors 52 implement an operating system (OS) and/or various applications. Examples of an OS include, for example, operating systems generally known under various trade names such as Apple macOS™, Microsoft Windows™, Android™, Linux™, and/or any other proprietary or open-source OS. Examples of applications include, for example, network applications, local applications, data input/output applications, user interaction applications, etc.

The instruction memory 54 may store instructions that are accessed (e.g., read) and executed by at least one of the one or more processors 52. For example, the instruction memory 54 may be a non-transitory, computer-readable storage medium such as a read-only memory (ROM), an electrically erasable programmable read-only memory (EEPROM), flash memory (e.g. NOR and/or NAND flash memory), content addressable memory (CAM), polymer memory (e.g., ferroelectric polymer memory), phase-change memory (e.g., ovonic memory), ferroelectric memory, silicon-oxide-nitride-oxide-silicon (SONOS) memory, a removable disk, CD-ROM, any non-volatile memory, or any other suitable memory. The one or more processors 52 may perform a certain function or operation by executing code, stored on the instruction memory 54, embodying the function or operation. For example, the one or more processors 52 may execute code stored in the instruction memory 54 to perform one or more of any function, method, or operation disclosed herein.

Additionally, the one or more processors 52 may store data to, and read data from, the working memory 56. For example, the one or more processors 52 may store a working set of instructions to the working memory 56, such as instructions loaded from the instruction memory 54. The one or more processors 52 may also use the working memory 56 to store dynamic data created during one or more operations. The working memory 56 may include, for example, random access memory (RAM) such as a static random access memory (SRAM) or dynamic random access memory (DRAM), Double-Data-Rate DRAM (DDR-RAM), synchronous DRAM (SDRAM), an EEPROM, flash memory (e.g. NOR and/or NAND flash memory), content addressable memory (CAM), polymer memory (e.g., ferroelectric polymer memory), phase-change memory (e.g., ovonic memory), ferroelectric memory, silicon-oxide-nitride-oxide-silicon (SONOS) memory, a removable disk, CD-ROM, any non-volatile memory, or any other suitable memory. Although embodiments are illustrated herein including separate instruction memory 54 and working memory 56, it will be appreciated that the computing device 50 may include a single memory unit that operates as both instruction memory and working memory. Further, although embodiments are discussed herein including non-volatile memory, it will be appreciated that computing device 50 may include volatile memory components in addition to at least one non-volatile memory component.

In some embodiments, the instruction memory 54 and/or the working memory 56 includes an instruction set, in the form of a file for executing various methods, such as methods for automated entity matching, as described herein. The instruction set may be stored in any acceptable form of machine-readable instructions, including source code or various appropriate programming languages. Some examples of programming languages that may be used to store the instruction set include, but are not limited to: Java, JavaScript, C, C++, C#, Python, Objective-C, Visual Basic, .NET, HTML, CSS, SQL, NoSQL, Rust, Perl, etc. In some embodiments a compiler or interpreter that converts the instruction set into machine executable code for execution by the one or more processors 52.

The input-output devices 58 may include any suitable device that allows for data input or output. For example, the input-output devices 58 may include one or more of a keyboard, a touchpad, a mouse, a stylus, a touchscreen, a physical button, a speaker, a microphone, a keypad, a click wheel, a motion sensor, a camera, and/or any other suitable input or output device.

The transceiver 60 and/or the communication port(s) 62 allow for communication with a network, such as the communication network 22 of FIG. 1. For example, if the communication network 22 of FIG. 1 is a cellular network, the transceiver 60 allows communications with the cellular network. In some embodiments, the transceiver 60 is selected based on the type of the communication network 22 the computing device 50 will be operating in. The one or more processors 52 are operable to receive data from, or send data to, a network, such as the communication network 22 of FIG. 1, via the transceiver 60.

The communication port(s) 62 may include any suitable hardware, software, and/or combination of hardware and software that is capable of coupling the computing device 50 to one or more networks and/or additional devices. The communication port(s) 62 may be arranged to operate with any suitable technique for controlling information signals using a desired set of communications protocols, services, or operating procedures. The communication port(s) 62 may include the appropriate physical connectors to connect with a corresponding communications medium, whether wired or wireless, for example, a serial port such as a universal asynchronous receiver/transmitter (UART) connection, a Universal Serial Bus (USB) connection, or any other suitable communication port or connection. In some embodiments, the communication port(s) 62 allows for the programming of executable instructions in the instruction memory 54. In some embodiments, the communication port(s) 62 allow for the transfer (e.g., uploading or downloading) of data, such as machine learning model training data.

In some embodiments, the communication port(s) 62 couple the computing device 50 to a network. The network may include local area networks (LAN) as well as wide area networks (WAN) including without limitation Internet, wired channels, wireless channels, communication devices including telephones, computers, wire, radio, optical and/or other electromagnetic channels, and combinations thereof, including other devices and/or components capable of/associated with communicating data. For example, the communication environments may include in-body communications, various devices, and various modes of communications such as wireless communications, wired communications, and combinations of the same.

In some embodiments, the transceiver 60 and/or the communication port(s) 62 utilize one or more communication protocols. Examples of wired protocols may include, but are not limited to, Universal Serial Bus (USB) communication, RS-232, RS-422, RS-423, RS-485 serial protocols, FireWire, Ethernet, Fibre Channel, MIDI, ATA, Serial ATA, PCI Express, T-1 (and variants), Industry Standard Architecture (ISA) parallel communication, Small Computer System Interface (SCSI) communication, or Peripheral Component Interconnect (PCI) communication, etc. Examples of wireless protocols may include, but are not limited to, the Institute of Electrical and Electronics Engineers (IEEE) 802.xx series of protocols, such as IEEE 802.11a/b/g/n/ac/ag/ax/be, IEEE 802.16, IEEE 802.20, GSM cellular radiotelephone system protocols with GPRS, CDMA cellular radiotelephone communication systems with 1×RTT, EDGE systems, EV-DO systems, EV-DV systems, HSDPA systems, Wi-Fi Legacy, Wi-Fi 1/2/3/4/5/6/6E, wireless personal area network (PAN) protocols, Bluetooth Specification versions 5.0, 6, 7, legacy Bluetooth protocols, passive or active radio-frequency identification (RFID) protocols, Ultra-Wide Band (UWB), Digital Office (DO), Digital Home, Trusted Platform Module (TPM), ZigBee, etc.

The display 64 may be any suitable display, and may display the user interface 66. For example, the user interface 66 may be a user interface for an application of a network environment operator that allows a user to view and interact with the operator's website. In some embodiments, a user may interact with the user interface 66 by engaging the input-output devices 58. In some embodiments, the display 64 may be a touchscreen, where the user interface 66 is displayed on the touchscreen.

The display 64 may include a screen such as, for example, a Liquid Crystal Display (LCD) screen, a light-emitting diode (LED) screen, an organic LED (OLED) screen, a movable display, a projection, etc. In some embodiments, the display 64 may include a coder/decoder, also known as Codecs, to convert digital media data into analog signals. For example, the visual peripheral output device may include video Codecs, audio Codecs, or any other suitable type of Codec.

The optional location device 68 may be communicatively coupled to a location network and operable to receive position data from the location network. For example, in some embodiments, the location device 68 includes a GPS device that receives position data identifying a latitude and longitude from one or more satellites of a GPS constellation. As another example, in some embodiments, the location device 68 is a cellular device configured to receive location data from one or more localized cellular towers. Based on the position data, the computing device 50 may determine a local geographical area (e.g., town, city, state, etc.) of its position.

In some embodiments, the computing device 50 that implements one or more modules or engines, each of which is constructed, programmed, configured, or otherwise adapted, to autonomously carry out a function or set of functions. A module/engine may include a component or arrangement of components implemented using hardware, such as by an application specific integrated circuit (ASIC) or field-programmable gate array (FPGA), for example, or as a combination of hardware and software, such as by a microprocessor system and a set of program instructions that adapt the module/engine to implement the particular functionality, which (while being executed) transform the microprocessor system into a special-purpose device. A module/engine may also be implemented as a combination of the two, with certain functions facilitated by hardware alone, and other functions facilitated by a combination of hardware and software. In certain implementations, at least a portion, and in some cases, all, of a module/engine may be executed on the processor(s) of one or more computing platforms that are made up of hardware (e.g., one or more processors, data storage devices such as memory or drive storage, input/output facilities such as network interface devices, video devices, keyboard, mouse or touchscreen devices, etc.) that execute an operating system, system programs, and application programs, while also implementing the engine using multitasking, multithreading, distributed (e.g., cluster, peer-peer, cloud, etc.) processing where appropriate, or other such techniques. Accordingly, each module/engine may be realized in a variety of physically realizable configurations, and should generally not be limited to any particular implementation exemplified herein, unless such limitations are expressly called out. In addition, a module/engine may itself be composed of more than one sub-modules or sub-engines, each of which may be regarded as a module/engine in its own right. Moreover, in the embodiments described herein, each of the various modules/engines corresponds to a defined autonomous functionality; however, it should be understood that in other contemplated embodiments, each functionality may be distributed to more than one module/engine. Likewise, in other contemplated embodiments, multiple defined functionalities may be implemented by a single module/engine that performs those multiple functions, possibly alongside other functions, or distributed differently among a set of modules/engines than specifically illustrated in the embodiments herein.

Figure 3:
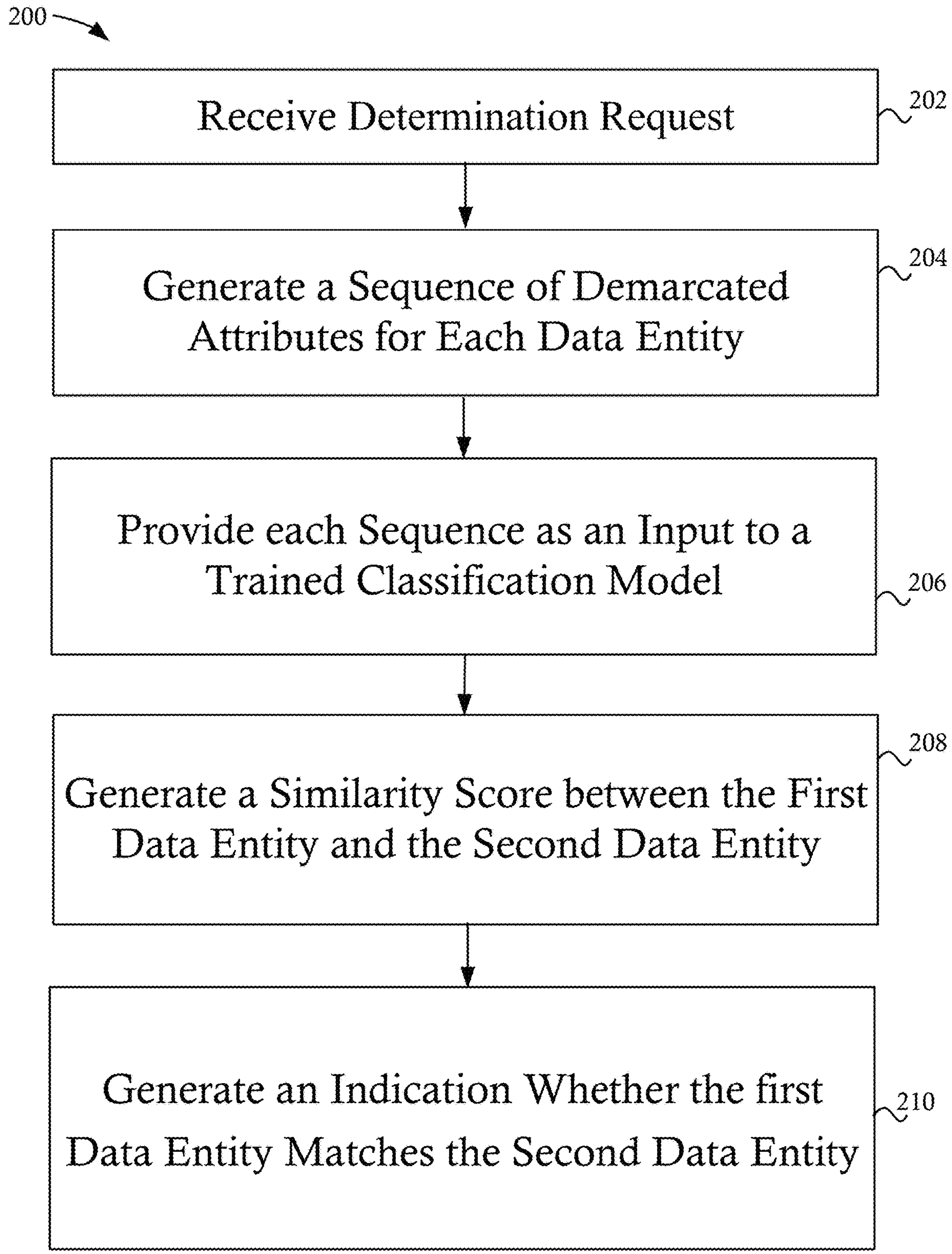
FIG. 3 is a flowchart illustrating an automated entity matching method, in accordance with some embodiments.
Figure 4:
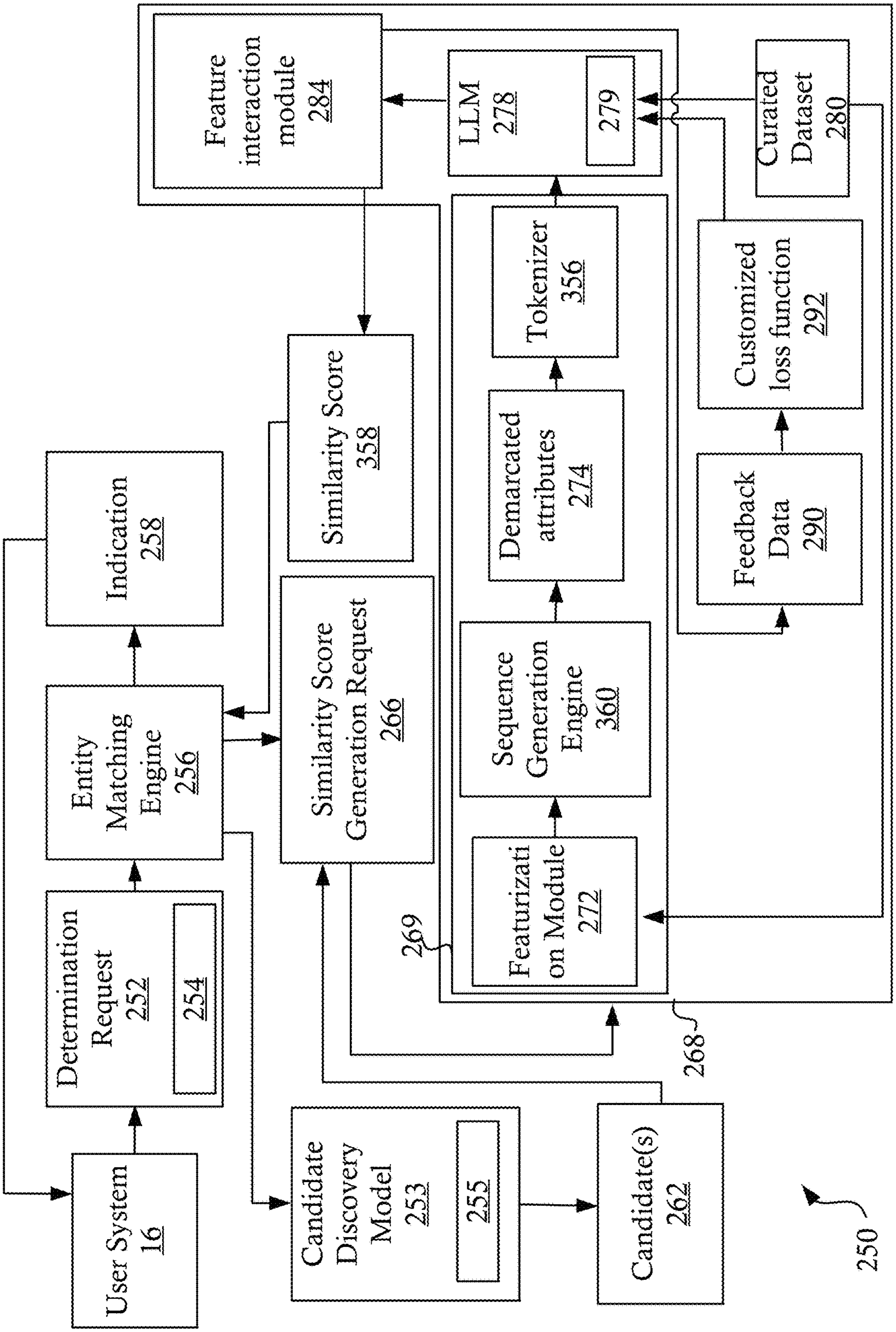
FIG. 4 is a process flow illustrating various steps of the automated entity matching method of FIG. 3, in accordance with some embodiments.

FIG. 3 is a flowchart illustrating an automated entity matching method 200, in accordance with some embodiments. FIG. 4 is a process flow 400 illustrating various steps of the automated entity matching method of FIG. 3, in accordance with some embodiments. At step 202, a determination request 252 is received. The determination request 252 prompts a determination of whether a first data entity 254 matches a second data entity. In some embodiments, the determination request 252 includes information about a second data entity. In some embodiments, the determination request 252 further includes a request to compare the first data entity (e.g., identified in the determination request 252) to all data entities in a different database to find a match. The determination request 242 may be generated by any suitable system, such as, for example, a user system 16, 18, 20. In some embodiments, the determination request 252 includes an identifier for the first data entity 254 that identifies one or more elements or data entities associated with a network environment. For example, in the context of an ecommerce environment, the identifier may include a data entity identifier that identifies a data entity included in an item catalog associated with the ecommerce environment. Although specific embodiments are discussed herein, it will be appreciated that the identifier may identify any suitable element for determining if a second data entity matches the first data entity, as disclosed herein.

In some embodiments, the second data entity is obtained from a list of candidate data entities that was previously generated, for example, via a candidate discovery model 253 based on identification and/or selection of the first data entity 254. For example, the first data entity 254 may be selected from a catalog associated with the network environment, e.g., an item catalog associated with an e-commerce environment. A candidate discovery model 253 may include a candidate generation engine 255 that search, sort, and/or crawl for data entities similar to the first data entity in one or more other catalogs, such as one or more catalogs associated with one or more other network environments. The candidate discovery model 253 may be a multi-modal system that includes: (1) live searches of one or more other network environments using, for example, (i) hard identifiers associated with the first data entity (such as UPC, MPN, ISBN, etc. in the context of an e-commerce environment); (ii) keywords associated with the first data entity (such as titles and brands in the context of an e-commerce environment); (iii) variant features for the corresponding first data entity (such as size, color, etc. in the context of an e-commerce environment); (iv) image search; (2) semantic searches based on keywords and/or product image vectorization; and (3) elastic searches using keywords and/or hard identifiers (such as UPC, MPN, ISBN, etc.). In some embodiments, attributes are extracted from the first data entity selection and/or the candidate generation engine and are provided as input to an automated entity matching engine 256. A vector search used in candidate discovery may include a deep learning model to represent a data entity as an embedding vector that includes text attributes and/or one or more images. A catalog vector index may be built using data entities discovered from other network environments and a number of most similar data entities (e.g., top-10 most similar data entities) may be extracted, for example using fast approximate nearest neighbor search. The matches may be classified using an equivalence model.

At step 204, information about the first data entity 254 and the second data entity is generated. The generated information may include, but is not limited to, a sequence (e.g., an ordered sequence) of demarcated attributes 274 of the first data entity 254 and second data entity. For example, the sequence may include feature tags that denote the start and the end of each feature/attribute in the order sequence. The demarcated attributes may include input features provided to a trained classification model, large language model (LLM) 278.

A step 206, the sequence that includes the demarcated attributes 274 is provided as an input, after passing through a tokenizer 356 (e.g., tokenizer 516 described in FIG. 6), to the trained classification model 278. In some embodiments, the trained classification model is trained via processes within portion 268, using a curated dataset 280 of annotated pairs of data entities (e.g., pairs are labeled as exact or incorrect match). Information from the curated dataset 280 may also be provided to the featurization module 272. Information from feature interaction module 284 may be provided as feedback data 290 during the training process. Weights 279 in the trained classification model may be determined (e.g., adjusted) based on a customizable loss function 292. The determination may be made based on feedback data 290 provided via backpropagation during the training of the classification model LLM 278. In some embodiments, the customizable loss function 292 includes a modified binary cross entropy loss function that penalizes the model based on sparsity in features and a penalization factor gamma to reduce the false positives. Although specific embodiments are discussed herein, it will be appreciated that any suitable customizable loss function may be implemented. During inference (e.g., determining if a first data entity matches a second data entity, etc.), processes in portion 269 (e.g., featurization module 272, sequence generation engine 360, demarcated attribute 274, and tokenizer 356, etc.) may be used.

At step 208, a similarity score 358 between the first data entity and the second data entity is generated. The similarity score 358 is representative, at least in part, of feature interactions between the first data entity and the second data entity, as determined by feature interaction module 284. The similarity score 358 may be generated by the trained model LLM 278 based on the sequence generated by sequence generation engine 360. In some embodiments, the trained model 278 is a pre-trained large language model (LLM) such as Decoding-enhanced Bidirectional Encoder Representations from Transformers (BERT) with disentangled attention (DeBERTa), that is based on transformer architecture. In some embodiments, the LLM receives input that includes the sequence having demarcated attributes from the step 206 after it has been passed through a tokenizer which creates a numerical representation of the sequence from the step 206. The LLM generates output embedding vectors (e.g., an intermediate mean pooled quantity 520 for data entity 1 and data entity 2, an individual intermediate mean pooled quantity 524 may be obtained for data entity 1, and an individual intermediate mean pooled quantity 526 may be obtained for data entity 2, as described in FIG. 6) which are pooled outputs of different tokens. In some embodiments, the similarity score is output, in part, by a logits function that provides a score indicating a likelihood that the two data entities are matched. Feature interactions between the first data entity and the second data entity include information derived from a difference of an embedding vector of two single entity sequences and a product of embedding vectors of two single entity sequences, as described below in reference to FIG. 6. In some embodiments, both a difference vector (e.g., a difference representation 534 between entity 1 and entity 2 as described in FIG. 6), and a product feature vector (e.g., a product representation 536 of entity 1 and entity 2 as described in FIG. 6), are concatenated to represent bi-linear interaction between one or more features.

In step 210, in accordance with a determination that the similarity score is greater than or equal to a predetermined threshold, an indication is generated that the first data entity matches the second data entity. In some embodiments, the predetermined threshold is determined based on different evaluation datasets. For example, different evaluation datasets may include different categories of entities (e.g., furniture, groceries, electronic devices, books, etc.), and a higher predetermined threshold (e.g., similarity score of greater than 0.8 out of a maximum of 1.0) may be assigned to entities that have more standardized features (e.g., ISBN for books, product serial numbers for electronic devices from major manufacturers) than entities with more variations (e.g., groceries, products from independent vendors). In some embodiments, if the similarity score is lower than the predetermined threshold, an indication is generated that the first data entity does not matches the second data entity.

Figure 5:
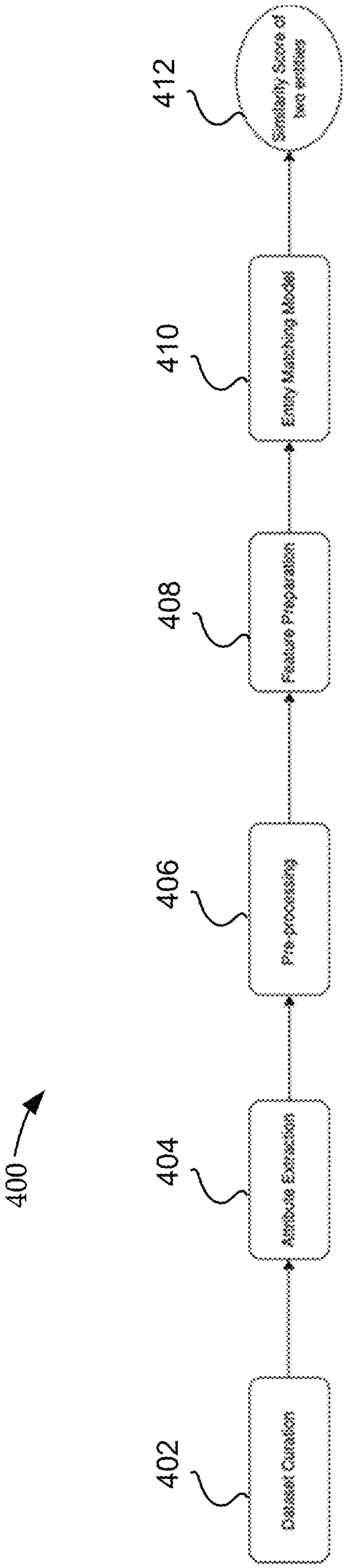
FIG. 5 a process flow 400 illustrating a similarity score generation process, in accordance with some embodiments.

FIG. 5 is a process flow 400 illustrating a similarity score generation process, in accordance with some embodiments. In a step 402, a dataset is curated specific to entity matching including a representation of a population that includes datapoints similar to a first entity and a second entity to be matched (e.g., a population of catalog entries in a network environment, a population of catalog entries in an ecommerce environment, etc.). An example curated dataset may include pairs (e.g., one million pairs, two million pairs, three million pairs, ten million pairs, etc.) of data entities from a corresponding network catalog. For example, a curated dataset may be generated from an item catalog in an ecommerce environment. The curated dataset may include an internal and proprietary dataset with a dataset size of around 2 million manually annotated pairs. Annotated pairs may be labeled, for example, as exact or incorrect matches. The pairs of data entities are labeled as a correct (e.g., exact) match or an incorrect match (e.g., or "matched" and "not_matched" labels). In some embodiments, a curated dataset may include noise and/or sparsity (e.g., sparsity relates to the degree to which one or more attributes of a data entity may be missing or ambiguous), increasing the difficulty of matching entities with high precision. The trained LLM may correctly identify matching elements even when attributes of a data entity are missing. The entity matching system may distinguish between variant or similar entities (e.g., chips of different flavors, or data entities having different colors) even when the LLM gives a high score for the two data entities due to their high degree of similarity.

In a step 404, one or more attributes necessary for entity matching are extracted from the curated dataset. For example, in the context of an e-commerce environment, extracted attributes may include, but are not limited to, title, super department, model number, color, size, brand, pack size, variant value, UPC, MPN, ISBN, etc. Example of variant values include: pertinent information (e.g., key information, etc.) about the data entity like color, size, material, dimensions, etc. The extracted attributes may be sent to a pre-processing layer in a step 406, which performs data cleaning and/or enriches attributes that are missing from the extracted attributes (e.g., if a particular attribute is missing after the attribute extraction process).

In a step 408, features needed as input to the entity matching model are prepared, for example, by extracting features from search results of entity descriptions and images. In some embodiments, a specific set of attributes corresponds to one or more features that are passed as inputs to the model. For example, a specific set of attributes may be used as a set of features and passed as input to the model. In an e-commerce environment, examples of features of a data entity include title, color, size, brand, super department, pack size, hard identifiers like UPC, MPN, ISBN, etc. In some embodiments, an input sequence for the two data entities to be matched is prepared from the features generated (e.g., obtained, output by, etc.) from step 408 and entity matching may be framed as a sequence of classifications based on those features (e.g., if a threshold number of features or demarcated attributes in an input sequence are classified to match, then the two entities are identified as being identical, or the demarcated attributes in the input sequence arranged hierarchically, such as titles, entity categories, and the sequence of classifications terminates at a specific demarcated attribute that does not match, etc.).

In a step 410, the features from step 408 are passed through the entity matching model. Details and architecture of the entity model in step 410 are described in reference to FIG. 6. In a step 412, the entity matching model provides a similarity score between two entities as its output, and a predetermined score threshold is evaluated to determine if the two entities are identical (e.g., same or matched).

Figure 6:
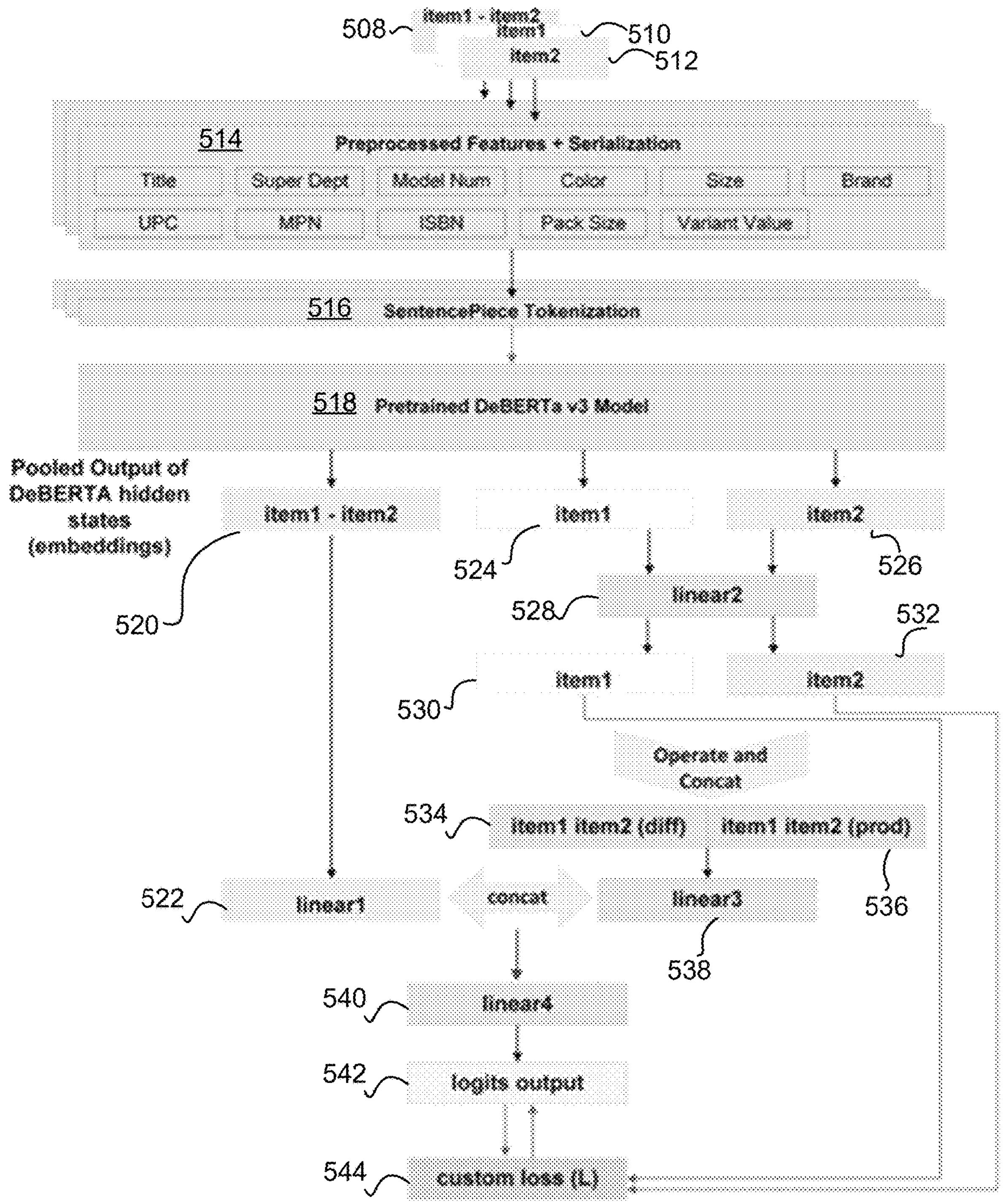
FIG. 6 shows an example architecture of the entity matching model, in accordance with some embodiments.

FIG. 6 shows an example architecture of the entity matching model, in accordance with some embodiments. An entity matching model 500 may receive an input including information about both data entities to be matched (e.g., a combined representation 508 of the two data entities to be matched, combined representations that include both entity sequences, a concatenated embedding vector representation of the two data entities, etc.), and also separate information about each of the data entities to be matched (e.g., separate single entity representations 510 and 512 of the respective data entities to be matched, a representation of a single entity embedding vector representation for data entity1, and a representation of a single entity embedding vector representation for data entity2, etc.).

In some embodiments, a layer 514 treats the preprocessed features (e.g., attributes that were extracted from the data entities), including enriching attributes that may have been missing after the extraction process, and performs serialization, including using a featurization technique that encodes information of the two entities in a combined sequence. For example, features of two entities may be concatenated in a sequence using feature tags. The feature tags correspond to attributes that are used as input features to the LLM. In some embodiments, a pair of feature tags defines the start and the end of each attribute in a sequence. For example, the use of feature tags may improve the representation of the attributes in vector space by injecting positional information that helps the model learn to disambiguate between two entities. As one non-limiting example, an input sequence may include: <CLS> Entity 1 Sequence<SEP><SEP> Entity 2 Sequence<SEP>, where <SEP> denotes a separator, and one non-limiting example of Entity 1 Sequence: <Title>Val<Title><Color>Val<Color><Size>Val<Size> <BRAND>Val<Brand><UPC>Val<UP C><Pack_Size>Val<Pack_Size>, etc. In some embodiments, <CLS> is a special token for "classify" and the two entity sequences are separated by a special token<SEP> for "separate." In some embodiments, individual entity sequences also use the feature tags described above.

In some embodiments, the input sequences are passed through a tokenizer 516 (e.g., SentencePiece Tokenization, which is an unsupervised text tokenizer and detokenizer mainly for Neural Network-based text generation systems where the vocabulary size is predetermined prior to the neural model training.) which creates a numerical representation of the input sequence. In some embodiments, the input sequence (e.g., input sequence 508) is a composite or concatenation of individual entity sequences (e.g., Entity 1 Sequence, and Entity 2 Sequence, etc. input sequence 510, and input sequence 512), separated by one or more separators. In some embodiments, the model includes a pre-trained large language model (LLM) such as DeBERTa, that is based on transformer architecture. In some embodiments, the LLM involves an architecture that includes the use of a single encoder (e.g., a Transformer encoder, a single stack of encoders, etc.) to encode the representation of a concatenated sequence of two entities and a representation for an individual sequence for each entity, which may reduce the number of learnable parameters. In some embodiments, the representation of the concatenated sequence of the two entities includes one or more arrays of one-hot encoded tokens that are converted, via embedding, into one or more arrays of vectors (e.g., representation vectors) representing the tokens. The single encoder performs transformations of the array of representation vectors.

The pre-trained LLM may be fine-tuned using a curated network-specific dataset (e.g., a dataset that includes annotated pairs of data entities) that helps the pre-trained LLM model in learning text representation in the context of a specific domain of the network environment, such as an e-commerce or retail domain. In some embodiments, during pre-training, given an input sequence (e.g., the example input sequence described above), the pre-trained LLM model predicts if the two data entities correspond (e.g., are "matched") in the training corpus, and may output either a "matched" or "not_matched" indication (e.g., or "exact" and "incorrect" match indications). In some embodiments, after processing the two entity sequences in the input sequence, a first output vector (e.g., the vector coding for <CLS>) is passed to a separate neural network for binary classification into either a "matched" or "not_matched" classification. By tuning the pre-trained LLM model, latent representations of words and phrases (e.g., feature attributes of different data entities) may be learned in context. After pre-training, an LLM can be fine-tuned with fewer resources on smaller datasets to optimize its performance on specific tasks (e.g., entity matching of two data entities).

A sequence having combined representation of two entities may be passed through a tuned LLM and a dense layer (e.g., a first linearizing layer 522, described below) and further concatenated with a feature representing bi-linear interaction (e.g., from a third linearizing layer 538, described below), generating a single feature representation. The single feature representation may be provided to a dense layer (e.g., a fourth linearizing layer 540, described below). A logits function 542 may receive the single feature representation as input and output a score (e.g., a confidence score) representing a likelihood of similarities between the two data entities. In some embodiments, different evaluation datasets are used to determine a threshold score above which two entities would be classified as being the same (e.g., matched).

The output of the tuned LLM model may be a multi-dimensional (e.g., a 768-dimensional) embedding vector which is a pooled output of different tokens. The architecture includes a combined representation of both entity sequences and uses single entity representations. A combined intermediate mean pooled quantity 520 for data entity 1 and data entity 2 may be obtained by taking averages across all dimensions of output vector from a tuned LLM and a linearizing layer 522 may pass through the linear representation of the mean pooled quantity 520. Similarly, an individual intermediate mean pooled quantity 524 may be obtained for data entity 1, and an individual intermediate mean pooled quantity 526 may be obtained for data entity 2. Each of the individual intermediate mean pooled quantities 524, 526 may be passed through a second linearizing layer 528 that is different from the linearizing layer 522. The output of a linearized quantity 530 for data entity 1 and a linearized quantity 532 for data entity 2 may be provided to a customized loss function 544.

In some embodiments, to increase precision of the entity-matching system, the customized loss function 544 may include a modified binary cross entropy loss function that is introduced to penalize the LLM based on sparsity in features. A penalization factor gamma may be introduced to reduce the false positives (e.g., indicating that two distinct entities match). A loss function is a function that compares the predicted output value (e.g., an output from logits function 542) with the actual value (e.g., target value) and measures how well the neural network models the training data. An objective of training is to minimize the loss function between the predicted and target outputs.

$$L = y\log(\hat{y})(1 + \cos sim(\text{item1 embed, item2 embed}))^{-\delta} + (1 - y)\log(1 - \hat{y})(1 + featsparsity)^{\gamma}$$

The first portion of the loss function, L=y log(ŷ)(1+cossim(item1 embed, item2 embed))$^{-\delta}$, relates to optimizing recall. For example, the cossim function computes the similarity between a first data entity sequence (e.g., the sequence having the feature tags described above, or "item1 embed," etc.) and a second data entity sequence (e.g., the sequence having the feature tags described above, or "item2 embed," etc.) in vector space. The model is rewarded, when making correct predictions, by minimizing the loss, which minimizes the distance between similar items in the vector space and brings matching data entities (e.g., identical data entities) closer together. The model is fine-tuned using the hyperparameters δ and γ. For example, when the model makes a correct prediction that matches the first data entity to the second data entity, the value of δ is adjusted (e.g., increased) to decrease the contribution of the first term to the loss function. Conversely, the value of d is adjusted (e.g., decreased) when the model makes an incorrect prediction (e.g., failing to recognize that two entities match, identifying only two duplicates in a set of data entities containing five duplicates, etc.) to decrease the contribution of the first term to the loss function. For example, a similarity score between the two data entity sequences (e.g., "item1 embed" and item2 embed", etc.) from encoder is used to reward the model when making correct predictions.

The second portion of the loss function, (1−y)log(1−ŷ)(1+featsparsity)$^{\gamma}$, relates to optimizing precision. The parameter "featsparsity" describes the number of features having a missing value out of the total number of features, and gamma is a penalization factor associated with the second portion of the loss function. In some embodiments, the reward and penalization loss terms interact together to optimize on the precision and recall of the matches. For example, the use of the described reward and penalization loss terms may improve recall by about 20%.

In some embodiments, the introduction of the loss function and/or the penalization factor gamma may help to create a more precise decision boundary and/or increase the distance between data elements that do not match. In some embodiments, the use of deep learning and neural networks, as disclosed herein provides better results compared to a rule-based approach (e.g., a sequence of if-else determinations to evaluate if two entities are identical, and/or match, etc.) For example, a rule-based approach may provide a precision of approximately 75%, while the deep learning approach described herein may provide a precision of approximately 90%.

In addition to being an input to the customized loss function 544, operations are performed on the output of a linearized quantity 530 for data entity 1 (or "item 1") and the output of the linearized quantity 532 for data entity 2 (or "item 2") to obtain a difference representation 534 (e.g., a vector) between item 1 and item 2, and a product representation 536 of item 1 and item 2, and the two representations 534 and 536 are concatenated together and passed through a third linearizing layer 538. To enable feature interaction between the two entities, the system generates (i) a difference of the embedding vectors of two single entity sequences, and (ii) a product of embedding vectors of two single entity sequences. The difference and the product of features are concatenated together to represent the bi-linear interaction between the features.

The output of the first linearizing layer 522 is then concatenated together with the output of the third linearizing layer 538, and passed through a fourth linearizing layer 540, from which a logits output 542 is obtained. The logits output is also provided to the customized loss function 544, and the output of the logits output 542 is also provided to optimize the logits output 542. For example, this information from the output of the customized loss function 544 may be provided as feedback while backpropagating during the training of the model. The LLM may be able to readjust the weights based on the loss function to yield an optimized set of weights which optimizes both precision and recall. The systems and methods described herein may be able to provide matches of two entities with a 90% precision, allowing the detection of anomalously priced items in an ecommerce environment, and may help to prevent price gouging while allowing matched entities to be priced competitively.

It will be appreciated that the determination of the similarity score as disclosed herein, particularly on large datasets intended to be used to compare data entities in large network environments such as ecommerce environments, is only possible with the aid of computer-assisted machine-learning algorithms and techniques, such as the automated entity matching model 500 disclosed here. In some embodiments, machine learning processes including large language models are used to perform operations that cannot practically be performed by a human, either mentally or with assistance, such as entity matching of different data entities. It will be appreciated that a variety of machine learning techniques can be used alone or in combination to generate a similarity score between respective pairs of data entities.

Figure 7:
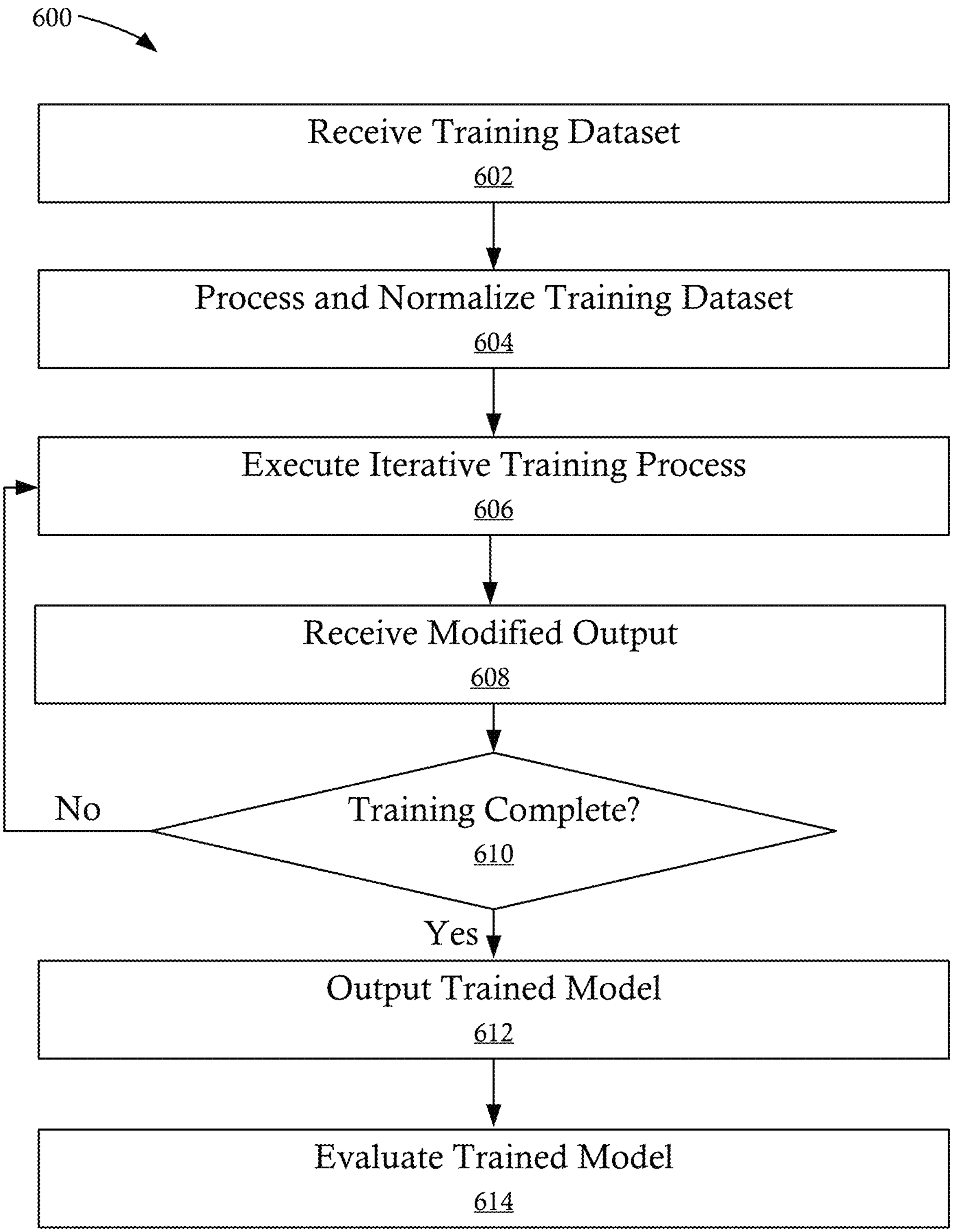
FIG. 7 is a flowchart illustrating a training method for generating a trained machine learning model, in accordance with some embodiments.
Figure 8:
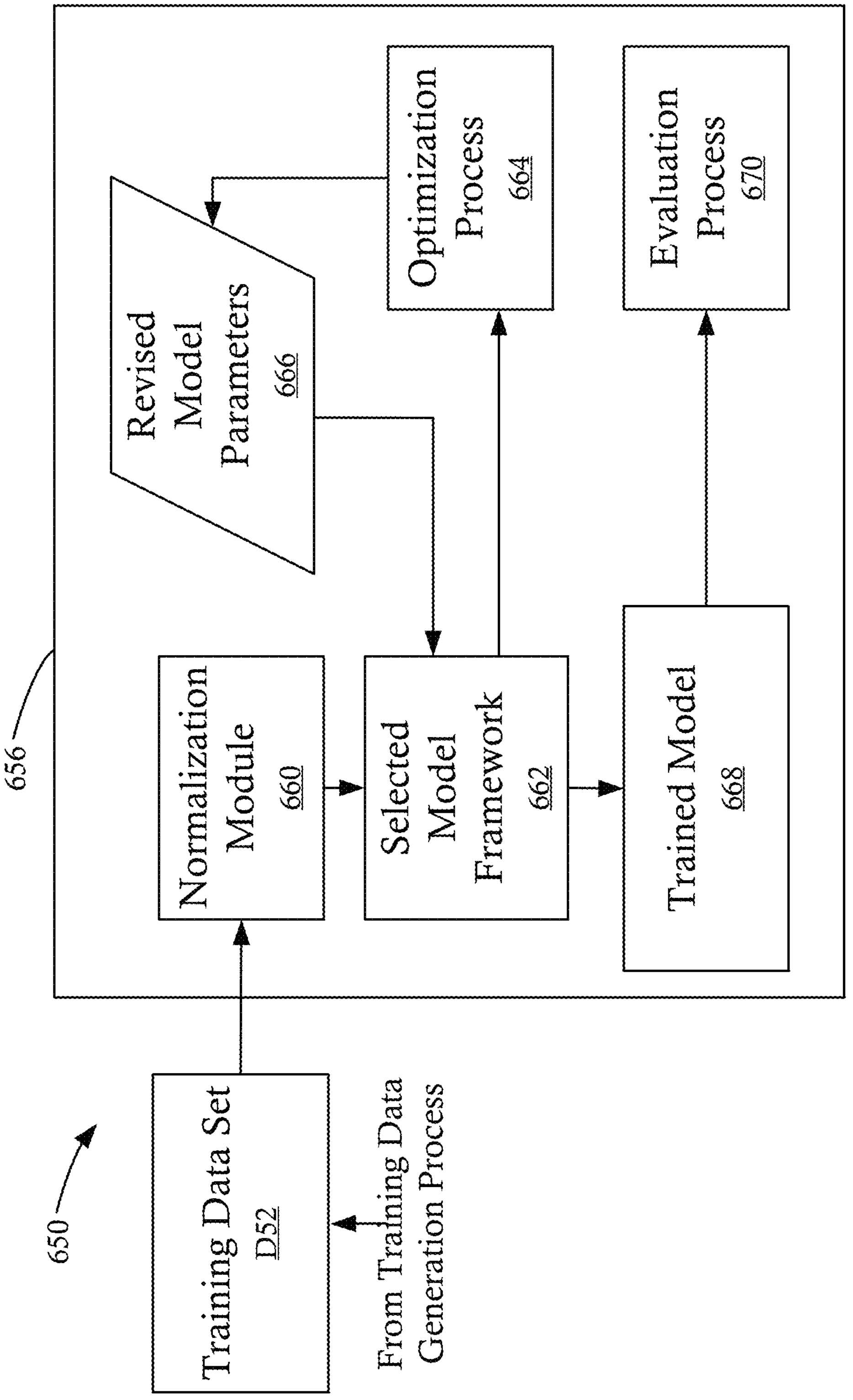
FIG. 8 is a process flow illustrating various steps of the training method of FIG. 7, in accordance with some embodiments.

In some embodiments, one or more trained models can be generated using an iterative training process based on a training dataset. FIG. 7 illustrates a method 600 for generating a trained model, such as a trained optimization model, in accordance with some embodiments. FIG. 8 is a process flow 650 illustrating various steps of the method 600 of generating a trained model, in accordance with some embodiments. At step 602, a training dataset 652 is received by a system, such as a processing device 10. The training dataset 652 can include labeled and/or unlabeled data. For example, in some embodiments, a set of labeled data is provided for use in training a model. In some embodiments, the training dataset 652 includes a dataset curated from an item catalog associated with an ecommerce environment.

At optional step 604, the received training dataset 652 is processed and/or normalized by a normalization module 660. For example, in some embodiments, the training dataset 652 can be augmented by imputing or estimating missing values of one or more features associated with the feature attribute extraction. In some embodiments, processing of the received training dataset 652 includes outlier detection that removes data likely to skew training of an automated entity matching model. In some embodiments, processing of the received training dataset 652 includes removing features that have limited value with respect to training of the automated entity matching model.

At step 606, an iterative training process is executed to train a selected model framework 662. The selected model framework 662 can include an untrained (e.g., base) machine learning model, and/or a partially or previously trained model (e.g., a prior version of a trained model). The training process iteratively adjusts parameters (e.g., hyperparameters) of the selected model framework 662 to minimize a cost value (e.g., an output of a cost function) for the selected model framework 662. In some embodiments, the cost value is related to correctly determining matches in an automated entity matching model.

The training process is an iterative process that generates set of revised model parameters 666 during each iteration. The set of revised model parameters 666 can be generated by applying an optimization process 664 to the cost function of the selected model framework 662. The optimization process 664 reduces the cost value (e.g., reduce the output of the cost function) at each step by adjusting one or more parameters during each iteration of the training process.

After each iteration of the training process, at step 608, a determination is made whether the training process is complete. The determination at step 608 can be based on any suitable parameters. For example, in some embodiments, a training process can complete after a predetermined number of iterations. As another example, in some embodiments, a training process can complete when it is determined that the cost function of the selected model framework 662 has reached a minimum, such as a local minimum and/or a global minimum.

At step 610, a trained model 668, such as a trained automated entity matching model, is output and provided for use in entity matching or other processes. At optional step 612, a trained model 668 can be evaluated by an evaluation process 670. A trained model can be evaluated based on any suitable metrics, such as, for example, an F or F1 score, normalized discounted cumulative gain (NDCG) of the model, mean reciprocal rank (MRR), mean average precision (MAP) score of the model, and/or any other suitable evaluation metrics. Although specific embodiments are discussed herein, it will be appreciated that any suitable set of evaluation metrics can be used to evaluate a trained model.

Figure 9:
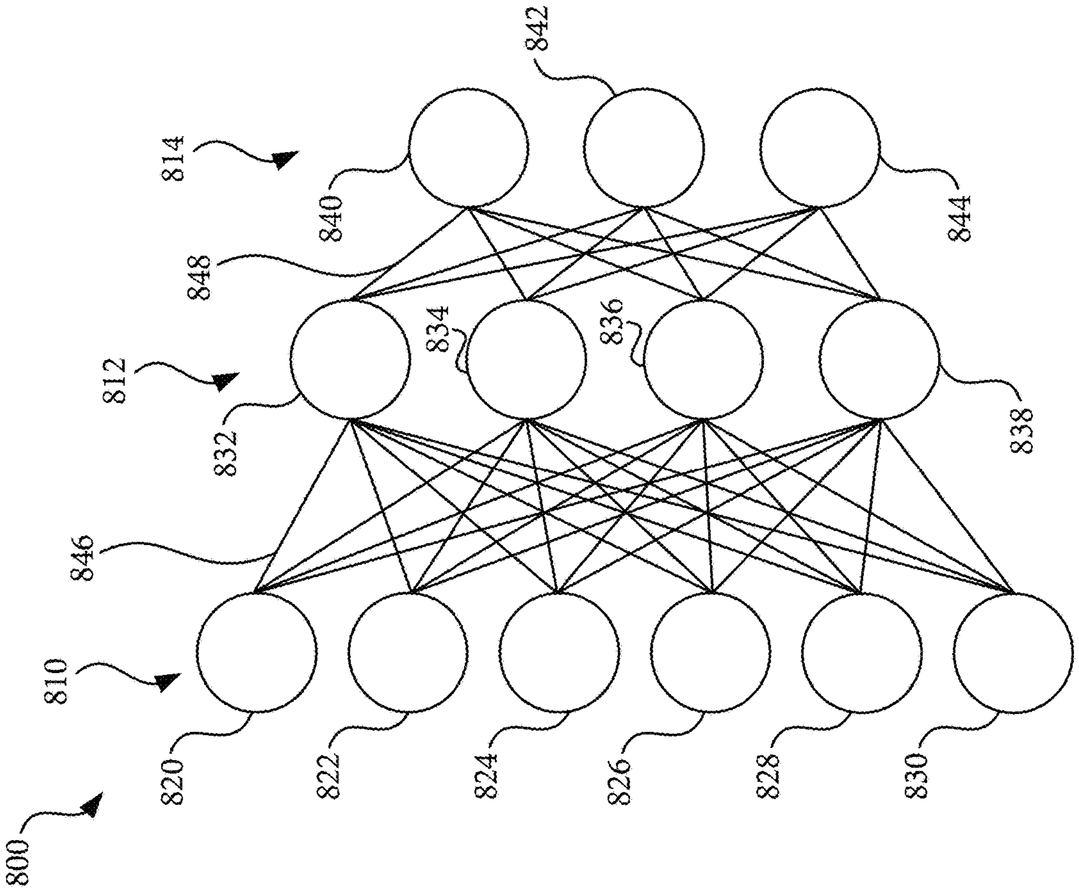
FIG. 9 illustrates an artificial neural network, in accordance with some embodiments.

FIG. 9 illustrates an artificial neural network 800, in accordance with some embodiments. Alternative terms for "artificial neural network" are "neural network," "artificial neural net," "neural net," or "trained function." The neural network 800 comprises nodes 820-844 and edges 846-848, wherein each edge 846-848 is a directed connection from a first node 820-838 to a second node 832-844. In general, the first node 820-838 and the second node 832-844 are different nodes, although it is also possible that the first node 820-838 and the second node 832-844 are identical. For example, in FIG. 9 the edge 846 is a directed connection from the node 820 to the node 832, and the edge 848 is a directed connection from the node 832 to the node 840. An edge 846-848 from a first node 820-838 to a second node 832-844 is also denoted as "ingoing edge" for the second node 832-844 and as "outgoing edge" for the first node 820-838.

The nodes 820-844 of the neural network 800 may be arranged in layers 810-814, wherein the layers may comprise an intrinsic order introduced by the edges 846-848 between the nodes 820-844 such that edges 846-848 exist only between neighboring layers of nodes. In the illustrated embodiment, there is an input layer 810 comprising only nodes 820-830 without an incoming edge, an output layer 814 comprising only nodes 840-844 without outgoing edges, and a hidden layer 812 in-between the input layer 810 and the output layer 814. In general, the number of hidden layer 812 may be chosen arbitrarily and/or through training. The number of nodes 820-830 within the input layer 810 usually relates to the number of input values of the neural network, and the number of nodes 840-844 within the output layer 814 usually relates to the number of output values of the neural network.

In particular, a (real) number may be assigned as a value to every node 820-844 of the neural network 800. Here, $$x_i^{(n)}$$

denotes the value of the i-th node 820-844 of the n-th layer 810-814. The values of the nodes 820-830 of the input layer 810 are equivalent to the input values of the neural network 800, the values of the nodes 840-844 of the output layer 814 are equivalent to the output value of the neural network 800. Furthermore, each edge 846-848 may comprise a weight being a real number, in particular, the weight is a real number within the interval [−1, 1], within the interval [0, 1], and/or within any other suitable interval. Here, $$w_{i,j}^{(m,n)}$$

denotes the weight of the edge between the i-th node 820-838 of the m-th layer 810, 812 and the j-th node 832-844 of the n-th layer 812, 814. Furthermore, the abbreviation $$w_{i,j}^{(n)}$$

is defined for the weight $$w_{i,j}^{(n,n+1)}.$$

In particular, to calculate the output values of the neural network 800, the input values are propagated through the neural network. In particular, the values of the nodes 832-844 of the (n+1)-th layer 812, 814 may be calculated based on the values of the nodes 820-838 of the n-th layer 810, 812 by $$x_j^{(n+1)} = f\left(\sum\nolimits_i x_i^{(n)} \cdot w_{i,j}^{(n)}\right)$$

Herein, the function f is a transfer function (another term is "activation function"). Known transfer functions are step functions, sigmoid function (e.g., the logistic function, the generalized logistic function, the hyperbolic tangent, the Arctangent function, the error function, the smooth step function) or rectifier functions. The transfer function is mainly used for normalization purposes.

In particular, the values are propagated layer-wise through the neural network, wherein values of the input layer 810 are given by the input of the neural network 800, wherein values of the hidden layer(s) 812 may be calculated based on the values of the input layer 810 of the neural network and/or based on the values of a prior hidden layer, etc.

In order to set the values $$w_{i,j}^{(m,n)}$$

for the edges, the neural network 800 has to be trained using training data. In particular, training data comprises training input data and training output data. For a training step, the neural network 800 is applied to the training input data to generate calculated output data. In particular, the training data and the calculated output data comprise a number of values, said number being equal with the number of nodes of the output layer.

In particular, a comparison between the calculated output data and the training data is used to recursively adapt the weights within the neural network 800 (backpropagation algorithm). In particular, the weights are changed according to $$w_{i,j}^{\prime(n)} = w_{i,j}^{(n)} - \gamma \cdot \delta_j^{(n)} \cdot x_i^{(n)}$$

wherein γ is a learning rate, and the numbers $$\delta_j^{(n)}$$

may be recursively calculated as $$\delta_j^{(n)} = \left(\sum\nolimits_k \delta_k^{(n+1)} \cdot w_{j,k}^{(n+1)}\right) \cdot f'\left(\sum\nolimits_i x_i^{(n)} \cdot w_{i,j}^{(n)}\right)$$

based on $$\delta_j^{(n+1)},$$

if the (n+1)-th layer is not the output layer, and $$\delta_j^{(n)} = \left(x_k^{(n+1)} - t_j^{(n+1)}\right) \cdot f'\left(\sum\nolimits_i x_i^{(n)} \cdot w_{i,j}^{(n)}\right)$$

if the (n+1)-th layer is the output layer 814, wherein f' is the first derivative of the activation, function, and $$y_j^{(n+1)}$$

is the comparison training value for the j-th node of the output layer 814.

In some embodiments, the neural network 100 is configured, or trained, to determine if a first data entity matches a second data entity (e.g., the first data entity and the second data entity correspond to the same entity).

Figure 10:
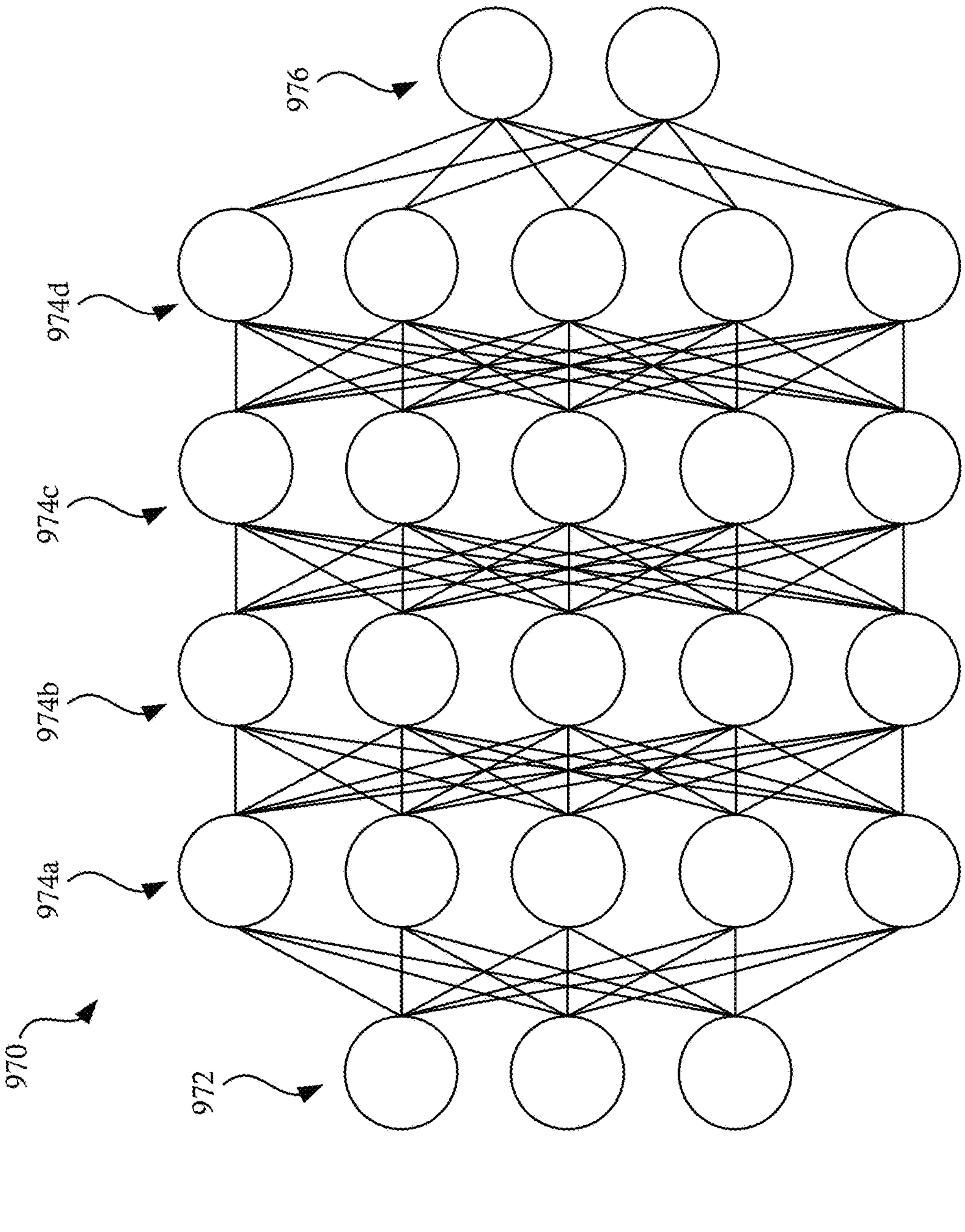
FIG. 10 illustrates a deep neural network (DNN), in accordance with some embodiments.

FIG. 10 illustrates a deep neural network (DNN) 970, in accordance with some embodiments. The DNN 970 is an artificial neural network, such as the neural network 800 illustrated in conjunction with FIG. 9, that includes representation learning. The DNN 970 may include an unbounded number of (e.g., two or more) intermediate layers 974*a*-974*d* each of a bounded size (e.g., having a predetermined number of nodes), providing for practical application and optimized implementation of a universal classifier. Each of the layers 974*a*-974*d* may be heterogenous. The DNN 970 may model complex, non-linear relationships. Intermediate layers, such as intermediate layer 974*c*, may provide compositions of features from lower layers, such as layers 974*a*, 974*b*, providing for modeling of complex data.

In some embodiments, the DNN 970 may be considered a stacked neural network including multiple layers each execute one or more computations. The computation for a network with L hidden layers may be denoted as:

$$f(x) = f\left[a^{(L+1)}\left(h^{(L)}\left(a^{(L)}\left( \ldots \left(h^{(2)}\left(a^{(2)}\left(h^{(1)}\left(a^{(1)}(x)\right)\right)\right)\right)\right)\right)\right)\right]$$

where $a^{(l)}(x)$ is a preactivation function and $h^{(l)}(x)$ is a hidden-layer activation function providing the output of each hidden layer. The preactivation function $a^{(l)}(x)$ may include a linear operation with matrix $W^{(l)}$ and bias $b^{(l)}$, where:

$$a^{(l)}(x) = W^{(l)}x + b^{(l)}$$

In some embodiments, the DNN 970 is a feedforward network in which data flows from an input layer 972 to an output layer 976 without looping back through any layers. In some embodiments, the DNN 970 may include a backpropagation network in which the output of at least one hidden layer is provided, e.g., propagated, to a prior hidden layer. The DNN 970 may include any suitable neural network, such as a self-organizing neural network, a recurrent neural network, a convolutional neural network, a modular neural network, and/or any other suitable neural network.

In some embodiments, a DNN 970 may include a neural additive model (NAM). An NAM includes a linear combination of networks, each of which attends to (e.g., provides a calculation regarding) a single input feature. For example, a NAM may be represented as:

$$y = \beta + f_1(x_1) + f_2(x_2) + \ldots + f_K(x_K)$$

where $\beta$ is an offset and each $f_i$ is parametrized by a neural network. In some embodiments, the DNN 970 may include a neural multiplicative model (NMM), including a multiplicative form for the NAM mode using a log transformation of the dependent variable y and the independent variable x:

$$y = e^{\beta} e^{f(\log x)} e^{\sum_i f_i^d(d_i)}$$

where d represents one or more features of the independent variable x.

Although the subject matter has been described in terms of example embodiments, it is not limited thereto. Rather, the appended claims should be construed broadly, to include other variants and embodiments, which may be made by those skilled in the art.

What is claimed is:

1. A system, comprising:

a database storing a trained classification model, wherein the trained classification model is trained using a dataset of annotated pairs of data entities, and wherein weights in the trained classification model are determined based on a customizable loss function;

a processor; and a non-transitory memory storing instructions, that when executed, cause the processor to:

receive, from a requesting system, a determination request;

for each of a first data entity and a second data entity, generate a sequence of demarcated attributes;

generate, using the trained classification model, a similarity score between the first data entity and the second data entity that accounts for feature interactions between the first data entity and the second data entity, wherein the trained classification model receives the demarcated attributes for each of the first data entity and the second data entity as inputs, generates a combined vector based on combining the first data entity and the second data entity, generates a product vector based on the first data entity and the second data entity, generates a difference vector based on the first data entity and the second data entity, concatenates the product vector and the difference vector to generate a first concatenated vector representing a bi-linear interaction between features of the first data entity and the second data entity, concatenates the combined vector and the first concatenated vector to generate a second concatenated vector, and accounts for the feature interactions based on the second concatenated vector; and in accordance with a determination that the similarity score is greater than a predetermined threshold, generate an indication that the first data entity matches the second data entity.

2. The system of claim 1, wherein the customizable loss function comprises a penalization factor gamma for reducing false positives and a modified binary cross entropy loss function that penalizes the trained classification model based on sparsity in features.

3. The system of claim 1, wherein the second data entity is obtained from a list of candidate data entities generated via a candidate discovery model.

4. The system of claim 1, wherein the similarity score is generated via a logits function that outputs a score indicative of a likelihood of similarities between the first data entity and the second data entity.

5. The system of claim 1, wherein the sequence of demarcated attributes comprises an ordered sequence having feature tags that denote a start and an end of each attribute in the ordered sequence.

6. The system of claim 1, wherein the dataset of annotated pairs of data entities comprises pairs that are labeled as an exact match or an incorrect match.

7. The system of claim 1, wherein the trained classification model is based on a transformer architecture, and the inputs provided to the trained classification model is first passed through a tokenizer that creates a numerical representation of the sequence of demarcated attributes.

8. A computer-implemented method, comprising:

receiving, from a requesting system, a determination request;

for each of a first data entity and a second data entity, generating generating, using a trained classification model, a similarity score between the first data entity and the second data entity that accounts for feature interactions between the first data entity and the second data entity, wherein the trained classification model receives the demarcated attributes for each of the first data entity and the second data entity as inputs, generates a combined vector based on combining the first data entity and the second data entity, generates a product vector based on the first data entity and the second data entity, generates a difference vector based on the first data entity and the second data entity, concatenates the product vector and the difference vector to generate a first concatenated vector representing a bi-linear interaction between features of the first data entity and the second data entity, concatenates the combined vector and the first concatenated vector to generate a second concatenated vector, and accounts for the feature interactions based on the second concatenated vector, and wherein the trained classification model is trained using a dataset of annotated pairs of data entities and wherein weights in the trained classification model are determined based on a customizable loss function; and in accordance with a determination that the similarity score is greater than a predetermined threshold, generating an indication that the first data entity matches the second data entity.

9. The computer-implemented method of claim 8, wherein the customizable loss function comprises a penalization factor gamma for reducing false positives and a modified binary cross entropy loss function that penalizes the trained classification model based on sparsity in features.

10. The computer-implemented method of claim 8, wherein the second data entity is obtained from a list of candidate data entities generated via a candidate discovery model.

11. The computer-implemented method of claim 8, wherein the similarity score is generated by a logits function that outputs a score indicative of a likelihood of similarities between the first data entity and the second data entity.

12. The computer-implemented method of claim 8, wherein the sequence of demarcated attributes comprises an ordered sequence having feature tags that denote a start and an end of each attribute in the ordered sequence.

13. The computer-implemented method of claim 8, wherein the trained classification model is based on a transformer architecture, and the inputs provided to the trained classification model is first passed through a tokenizer that creates a numerical representation of the sequence of demarcated attributes.

14. A non-transitory computer-readable medium having instructions stored thereon that, when executed by a processor, cause a device to perform operations comprising:

receiving, from a requesting system, a determination request;

for each of a first data entity and a second data entity, generating:

a sequence of demarcated attributes;

generating, using a trained classification model, a similarity score between the first data entity and the second data entity that accounts for feature interactions between the first data entity and the second data entity, wherein the trained classification model receives the demarcated attributes for each of the first data entity and the second data entity as inputs, generates a combined vector based on combining the first data entity and the second data entity, generates a product vector based on the first data entity and the second data entity, generates a difference vector based on the first data entity and the second data entity, concatenates the product vector and the difference vector to generate a first concatenated vector representing a bi-linear interaction between features of the first data entity and the second data entity, concatenates the combined vector and the first concatenated vector to generate a second concatenated vector, and accounts for the feature interactions based on the second concatenated vector, and wherein the trained classification model is trained using a dataset of annotated pairs of data entities, and wherein weights in the trained classification model are determined based on a customizable loss function; and in accordance with a determination that the similarity score is greater than a predetermined threshold, generating an indication that the first data entity matches the second data entity.

15. The non-transitory computer-readable medium of claim 14, wherein the customizable loss function comprises a penalization factor gamma for reducing false positives and a modified binary cross entropy loss function that penalizes the trained classification model based on sparsity in features.

16. The non-transitory computer-readable medium of claim 14, wherein the second data entity is obtained from a list of candidate data entities generated via a candidate discovery model.

17. The non-transitory computer-readable medium of claim 14, wherein the similarity score is generated by a logits function that outputs a score indicative of a likelihood of similarities between the first data entity and the second data entity.

* * * * *